Jan. 24, 1956  W. F. HUCH ET AL  2,732,013
METHOD OF CUTTING SYMMETRICAL BALLOON GORES
AND CONSTRUCTION TABLE FOR
PRACTICING THE METHOD
Filed May 9, 1950
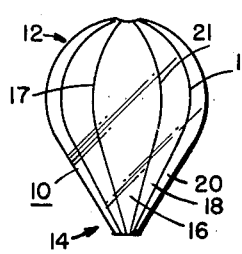
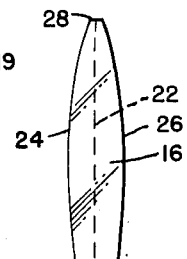
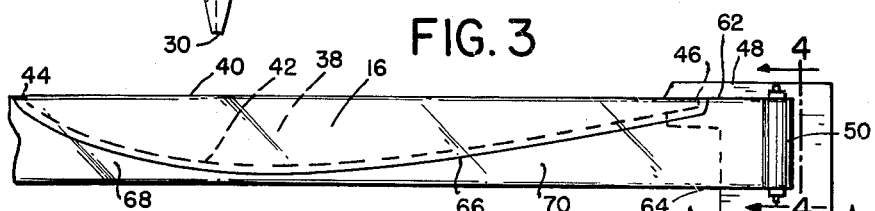
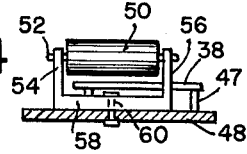
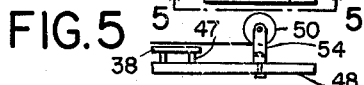
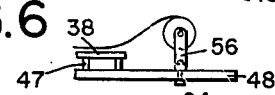
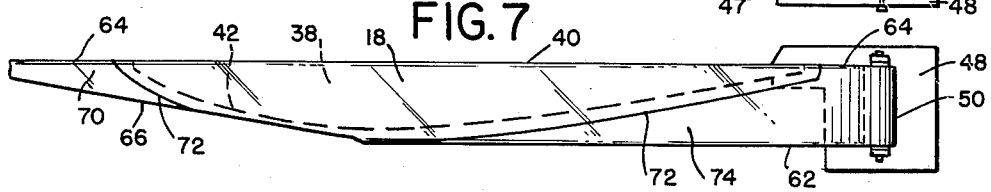
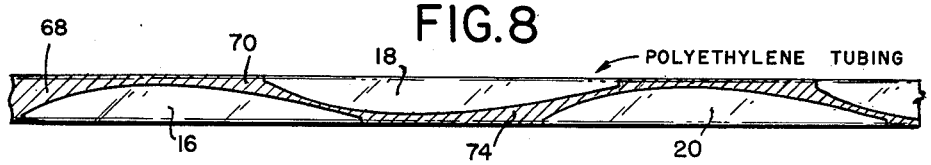
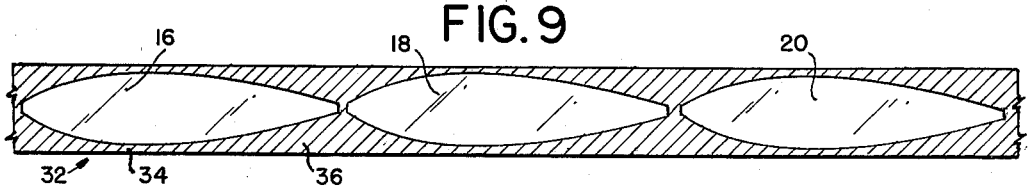
INVENTORS
WILLIAM F. HUCH
RAYMOND I. HAKOMAKI
CHARLES B. MOORE, JR.
BY *William C. Babcock*
ATTORNEY

United States Patent Office 2,732,013
Patented Jan. 24, 1956

2,732,013

METHOD OF CUTTING SYMMETRICAL BALLOON GORES AND CONSTRUCTION TABLE FOR PRACTICING THE METHOD

William F. Huch, St. Paul, and Raymond I. Hakomaki and Charles B. Moore, Jr., Minneapolis, Minn., assignors to General Mills Inc., a corporation of Delaware Application May 9, 1950, Serial No. 160,972

8 Claims. (Cl. 164—17)

The present invention relates to a balloon manufacturing method and to improved equipment or apparatus for carrying out the method. The method and apparatus are particularly designed for the construction of balloons from tubular thermoplastic sheet material.

One object of the invention is the provision of an improved method of balloon construction.

A further object is the provision of an improved method in which a balloon body is formed of a plurality of individual gores or sections initially cut from tubular thermoplastic material.

Still another object is the provision of an improved method of cutting balloon gores from tubular sheet material with a minimum of waste.

A further object is the provision of an improved balloon construction table for practicing the method of the present invention.

Other objects and advantages of the invention will be apparent from the following specification in which preferred embodiments have been described. In the drawings accompanying this specification, in which like reference characters indicate like parts, Figure 1 is a side elevation of a balloon body made according to the invention.

Fig. 2 is a plan view of an individual gore section of the balloon of Fig. 1.

Fig. 3 is a plan view of a balloon construction table on which a strip of tubular thermoplastic sheet material has been positioned and cut to provide the first gore.

Fig. 4 is a partial sectional view on the line 4—4 of Fig. 3.

Fig. 5 is a view on the line 5—5 of Fig. 3.

Fig. 6 is a view similar to Fig. 5 but showing the apparatus moved to its alternate position for laying out the next strip of gore material.

Fig. 7 is a plan view similar to Fig. 3 showing the second gore section being laid out.

Fig. 8 is a schematic plan view showing how the successive gore sections are cut from the strip of tubular thermoplastic material according to the present invention, and Fig. 9 is a plan view similar to Fig. 8, but showing the prior art method of cutting successive gores from a single thickness of flat thermoplastic sheet material.

As shown in Fig. 1, the present process and apparatus are suitable for the manufacture of a balloon envelope 10 which consists of a spherical upper section 12 and a somewhat conical lower section 14. The balloon envelope includes a plurality of vertically extending gores 16, 18, and 20 which have their longitudinal edges suitably seamed to each other and to adjacent gores as indicated at 17, 21, and 19 to form the balloon envelope.

One of these individual gores 16 is illustrated in Fig. 2 and is symmetrically formed with respect to an imaginary longitudinal center line 22. The longitudinal edges 24 and 26 of gore 16 taper in both directions from an intermediate portion of maximum width toward the narrow upper end 28 and the narrow lower end 30. The particular contour of the edges 24 and 26 can be selected by appropriate design to obtain a finished balloon of the shape shown in Fig. 1 or of any other suitable and desired shape.

As shown in Fig. 9, it has been customary in the prior art to cut the individual balloon gores from a single flat sheet or strip 32 of thermoplastic material. Such a strip necessarily has a width slightly greater than the maximum width of the desired final gores. The gores 16, 18, and 20 have customarily been cut separately from successive portions of the strip 32 and have been oriented with their longitudinal axes parallel to the strip.

In the use of such a method it is apparent that there will be a certain necessary waste area 34 at each edge of the desired gore and a relatively large intermediate waste area indicated generally at 36 outside of the narrow tapered upper and lower ends of the gore patterns.

According to the present invention, it has been found that the successive gore sections can be successfully and economically cut from tubular thermoplastic sheet material in such a manner that the total amount of waste material will be substantially reduced, without loss in strength and efficiency of the resulting gores. The process is particularly suitable for use with tubular polyethylene material since such material retains its strength and flexibility even at the creased edges of the tubing after normal storage in roll form.

The features described in the present application are particularly suitable for use in carrying out the improved method described and claimed in the copending application of Stinger et al., Serial No. 160,973 filed of even date herewith, now Patent No. 2,703,769, and assigned to the owner of the present application.

As described in that application, a plurality of gore sections of tubular material are superimposed on a suitable pattern or balloon table, with one folded edge of each tubular section in registry with a straight edge of the pattern or balloon table to constitute the center line of the finished gore. The opposite edge of the tubular material section is roughly trimmed to the outer contour of the gore, and these free edges are subsequently united successively to the free edges of adjacent gores by a suitable seaming apparatus designed to move longitudinally of the balloon table along the line of the desired contour.

As shown in Fig. 3, such a balloon table 38 has the general shape of a half gore of the final balloon. Thus one edge 40 of table 38 is straight and is designed to correspond to the center line of the resulting gore. The opposite edge 42 of the table is tapered or curved following the contour of the desired gore edges 24 and 26 of Fig. 2 and approaches the straight edge 40 of the table at a point 44 corresponding to the upper edge of the gore and also at a point 46 corresponding to the lower end of the gore. At this latter end of the balloon table, a supporting platform 48 is provided which is downwardly offset from the table portion 38 and is connected thereto by suitable frame members 47 (Figs. 3–6). This supporting platform 48 is provided with means to carry a supply roll 50 of tubular thermoplastic material such as polyethylene tubing. As shown particularly in Fig. 4, the supply roll 50 is rotatably supported on a shaft or axle 52, journalled in vertical supporting posts or trunnions 64 and 56, respectively. Supporting posts 54 and 56 are connected to a common base portion 58 which is pivoted at 60 to the supporting platform 48 for rotation of the supporting device and supply roll 50 on a vertical axis with respect to the platform.

With the supply roll 50 and supporting means originally in the position shown in Figs. 3, 4, and 5, the tubular material is drawn along above the table 38 until it covers the full longitudinal extent thereof. One folded edge 62 of the tubular material is placed in exact alignment with the straight edge 40 of the balloon table corresponding to the center line of the resulting gore. The other folded edge 64 of the tubular material projects across the table 38 beyond the curved edge 42. With the sheet material in the position of Fig. 3, the tubular strip is then cut roughly to the shape of the final gore along a line 66 which is spaced outwardly a slight distance from the edge 42 of the balloon table 38. As a result of this cutting operation, an angular waste strip is formed at 68 at the leading corner of the tube. Because of the contour of table edge 42 and of the line of severance 66 the portion of tubular material left on the supply roll will now have a long tapered end as indicated generally at 70.

It will be noted that in the position of the parts shown in Figs. 3–5, the supply roll 50 is so oriented that the tubular material is drawn from the bottom of the roll and from right to left in the drawings.

Supply roll 50 and its supporting cradle 54, 56, 58 is now rotated 180° around its pivotal axis 60 from the position of Fig. 5 to the position of Fig. 6. The free end 70 of material will then be pulled from the top of the roll from right to left across the balloon table 38 as shown in Fig. 7, until the table portion 38 is completely covered by the tubular strip. Whereas the first gore was formed in Fig. 3 with the folded edge 62 of the tubular material aligned with edge 40 of the table to constitute the center line of the resulting gore, the next gore, as shown in Fig. 7, will have the opposite folded edge 64 of the tubular thermoplastic material in alignment with the straight edge 40 of the table. Thus the second gore will have its center line at the opposite folded edge of the tubular strip from the first gore. In this manner advantage is taken of the tapered extension 70 which resulted from the line of severance 66 of the first gore. The angular orientation of the cut edge 66 will minimize the portion which needs to be severed and cut away during the rough trimming of the second gore. During this rough trimming step, the tubular sheet material will be cut along the lines 72 similar to the line of severance 66 of Fig. 3. Thus, as shown in Fig. 7, only a relatively small portion of the triangular free end 70 will be wasted. At the same time, the line of severance 72 will again provide an angular or tapered free end 74 on the main body of tubular material which extends from supply roll 50. After severance of this second gore along the line 72, the supply roll and its supporting carriage will again be reversed back to the original position of Figs. 3, 4, and 5 and the third gore will then be cut in the same manner as illustrated in Fig. 3. This reversal of the supply roll and the resulting reversal of the location of the respective folded edges of the tubular material between the cutting of each successive gore will result in the cutting of the gores from alternate sides of the tubular sheet with a minimum of waste material. The general arrangement and orientation of these gores with respect to the sheet is illustrated in Fig. 8. Even though the waste portions indicated in Fig. 8 represent a double thickness of material, in view of the use of a tubular sheet, it will be apparent that the actual waste area according to the process of the present invention is greatly reduced as compared to the amount of material wasted in following the prior art method illustrated in Fig. 9. In actual practice, the process of the present invention involving the alternate cutting of the individual gore sections from opposite sides of tubular sheet material may amount to twenty to twenty-five per cent of the total amount of material required, including all waste.

A process and apparatus have accordingly been provided which accomplish the objects set forth at the beginning of this specification. The use of such process and apparatus make it possible to effect substantial savings, particularly in combination with the method and apparatus described and claimed in the above-mentioned Stinger et al., application.

Since minor variations and changes in the exact details of construction will be apparent to persons skilled in this field, it is intended that this invention shall cover all such changes and modifications as fall within the spirit and scope of the attached claims.

We claim as our invention:

1. The method of cutting symmetrical balloon gores from a continuous flat tube of thermoplastic sheet material having upper and lower layers joined by integral spaced folded edges, the width of the tube being substantially less than the maximum gore width but at least as great as one-half of said maximum gore width, with the aid of a pattern shaped corresponding to a half-gore and having a straight edge corresponding to a centerline of the desired gore and a curved edge corresponding to the desired gore edge shape, which comprises superimposing the tube on the pattern with one folded edge of the tube in alignment with said straight edge, cutting the tube along said curved edge to form a first gore doubled along its centerline, reversing the tube and advancing it relative to the pattern to cover the pattern with the opposite tube edge in alignment with said straight edge, cutting the tube along said curved edge to form a second gore, and successively reversing the tube between the cutting of each gore and the next succeeding gore and thereby using the opposite folded edges of the tube alternately as the centerlines of successive gores.

2. The method of cutting symmetrical balloon gores from a continuous flat tube of thermoplastic sheet material having upper and lower layers joined by integral spaced folded edges, the width of the tube being substantially less than the maximum gore width but at least as great as one-half of said maximum gore width, with the aid of a pattern shaped corresponding to a half-gore and having a straight edge corresponding to a centerline of the desired gore and a curved edge corresponding to the desired gore edge shape, which comprises superimposing the tube on the pattern with one folded edge of the tube in alignment with said straight edge, cutting the tube along said curved edge to form a first gore doubled along its centerline, reversing the tube and advancing it relative to the pattern to just cover the pattern with the opposite tube edge in alignment with said straight edge, cutting the tube along said curved edge to form a second gore, and successively reversing the tube between the cutting of each gore and the next succeeding gore and thereby using the opposite folded edges of the tube alternately as the centerlines of successive gores.

3. The method of cutting symmetrical balloon gores having tapered ends from a continuous flat tube of thermoplastic sheet material having upper and lower layers joined by integral spaced folded edges, the width of the tube being substantially less than the maximum gore width but at least as great as one-half of said maximum gore width, with the aid of a half-gore pattern having one straight edge corresponding to the centerline of the desired gore and one curved edge tapering toward the straight edge at both ends corresponding to the desired gore edge shape, which comprises successively applying the tube to the pattern with first one folded edge and then the other folded edge in alignment with the straight edge of the pattern, cutting the tube along said curved edge to form a complete gore, doubled along its centerline, for each application of the tube to the pattern, and advancing the tube between each application just far enough to cover all portions of the pattern.

4. The method of cutting symmetrical balloon gores having tapered ends from a continuous flat tube of thermoplastic sheet material having upper and lower layers joined by integral spaced folded edges, the width of the tube being substantially less than the maximum gore width but at least as great as one-half of said maximum gore width, with the aid of a half-gore pattern having one straight edge corresponding to the centerline of the desired gore and one curved edge tapering toward the straight edge at both ends corresponding to the desired gore edge shape, which comprises successively applying the tube to the pattern with first one folded edge and then the other folded edge in alignment with the straight edge of the pattern, cutting the tube along said curved edge to form a complete gore, doubled along its centerline, for each application of the tube to the pattern, the cutting of each gore at one tapered end of the pattern leaving an angular extension on the tubular strip, and advancing the tube between each application just far enough for the angular extension to cover completely the opposite tapered end of the pattern.

5. A balloon construction table having a surface corresponding to a half-gore of the balloon and defined by a straight edge corresponding to a centerline of a complete gore and a curved edge tapering toward the straight edge at each end corresponding to the desired gore edge contour, supporting means adjacent one end of the table for a supply roll of flat tubular thermoplastic sheet material, the supporting means being located with the axis of the supply roll perpendicular to the straight table edge and with one end of the supply roll in line with said straight edge, and means rotatably carrying said supporting means for rotation of the supply roll through at least 180° to align the opposite end of the supply roll with said straight edge.

6. A balloon construction table according to claim 5 in which the supporting means for the supply roll is rotatable on a vertical axis.

7. The method of cutting symmetrical balloon gores having tapered ends from a roll of continuous flat tubular sheet material having opposite folded edges spaced apart slightly more than half the maximum desired gore width, with the aid of a stationary pattern table having one straight guide corresponding to the centerline of the desired gore and one curved guide tapering toward the straight guide at both ends corresponding to the desired gore edge shape, which comprises feeding a length of material from the roll onto the pattern table with one folded edge of the tube in alignment with said straight guide and with the material covering the table between the straight and curved guides, cutting the tube along the curved guide thereby forming a first complete gore doubled along its centerline, reversing the roll and feeding a second length of material onto the pattern table with the opposite folded edge of the tube in alignment with said straight guide and with the material again covering the table between the straight and curved guides, cutting the tube along the curved guide thereby forming a second complete gore doubled along its centerline, similarly and successively reversing the roll and feeding and cutting further lengths of material on the table, with first one folded edge and then the other folded edge aligned with the straight guide until the desired number of gores have been formed.

8. The method of cutting symmetrical balloon gores according to claim 7 in which the material for each gore is fed from the roll just sufficiently to cover all portions of the table area between the guides.

References Cited in the file of this patent

UNITED STATES PATENTS

| | | |
|---|---|---|
| 1,021,002 | Pollard et al. | Mar. 26, 1912 |
| 1,385,601 | Winkley | July 26, 1921 |
| 1,612,390 | Maynard | Dec. 28, 1926 |
| 1,622,257 | Stevens | Mar. 22, 1927 |
| 1,763,148 | Gusdorf | June 10, 1930 |
| 1,974,203 | Collins | Sept. 18, 1934 |
| 2,122,254 | Kranich et al. | June 28, 1938 |
| 2,446,198 | Socke | Aug. 3, 1948 |
| 2,480,721 | Egenolf et al. | Aug. 30, 1949 |

FOREIGN PATENTS

| | | |
|---|---|---|
| 335,990 | Germany | Apr. 22, 1921 |